United States Patent [19]

Matsumoto et al.

[11] 4,103,153
[45] Jul. 25, 1975

[54] DEVICE FOR MEASURING LIGHT INCIDENT ON AN IMAGE FORMING OPTICAL SYSTEM

[75] Inventors: Kazuya Matsumoto, Yokohama; Susumu Matsumura, Kawasaki; Aiichiro Koyama, Hokkaido; Youichi Okuno, Yokohama; Tokuichi Tsunekawa, Yokohama; Tadashi Ito, Yokohama, all of Japan

[73] Assignee: Canon Kabushiki Kaisha, Tokyo, Japan

[21] Appl. No.: 691,628

[22] Filed: Jun. 1, 1976

[30] Foreign Application Priority Data

| Jun. 6, 1975 | [JP] | Japan | 50-68765 |
| Jun. 6, 1975 | [JP] | Japan | 50-68766 |
| Jun. 6, 1975 | [JP] | Japan | 50-68767 |
| Jun. 6, 1975 | [JP] | Japan | 50-68768 |
| Jun. 6, 1975 | [JP] | Japan | 50-68769 |
| Jun. 6, 1975 | [JP] | Japan | 50-68770 |
| Jun. 6, 1975 | [JP] | Japan | 50-68771 |
| Jun. 6, 1975 | [JP] | Japan | 50-68772 |
| Jun. 6, 1975 | [JP] | Japan | 50-68773 |
| Jun. 6, 1975 | [JP] | Japan | 50-68774 |
| Jun. 6, 1975 | [JP] | Japan | 50-68775 |
| Jun. 6, 1975 | [JP] | Japan | 50-68776 |
| Jun. 6, 1975 | [JP] | Japan | 50-68777 |
| Jun. 6, 1975 | [JP] | Japan | 50-68778 |
| Jun. 6, 1975 | [JP] | Japan | 50-68779 |
| Jun. 6, 1975 | [JP] | Japan | 50-68780 |
| Jun. 6, 1975 | [JP] | Japan | 50-68781 |
| Jun. 6, 1975 | [JP] | Japan | 50-68782 |
| Jun. 6, 1975 | [JP] | Japan | 50-68783 |

[51] Int. Cl.² .............................. G02B 5/14
[52] U.S. Cl. ................... 250/227; 350/162 R
[58] Field of Search .......... 350/162 R, 96 C, 96 WG, 350/3.5; 250/227

[56] References Cited

U.S. PATENT DOCUMENTS

| 3,501,238 | 3/1970 | Stetson et al. | 350/162 R X |
| 3,549,239 | 12/1970 | Brienza et al. | 350/162 R |
| 3,584,948 | 6/1971 | Herriett | 350/162 R X |
| 3,698,795 | 10/1972 | Flint | 350/162 R |
| 3,800,298 | 3/1974 | Ogura et al. | 350/3.5 X |
| 3,936,138 | 2/1976 | Noguchi | 350/3.5 |

Primary Examiner—David C. Nelms
Assistant Examiner—Vincent J. Sunderdick
Attorney, Agent, or Firm—Toren, McGeady and Stanger

[57] ABSTRACT

The present invention relates to a device for measuring light incident on an image forming optical system, making use of a plural number of the diffraction element. The plural number of the diffraction elements are respectively provided in the optical path of the image forming optical system. Further the plural number of the diffraction elements respectively present a certain predetermined area. The plural number of the diffraction elements, seen along the direction of the optical axis of the image forming optical system, are substantially only partially overlapped with respect to each other. The light beam incident on a diffraction element is divided into a non diffracted light beam and a diffracted light beam. Thus diffracted light beam is directed toward the light detecting means so as to be measured while the non diffracted light beam advances along the above mentioned optical axis. Consequently at the part at which the diffraction elements overlap each other, the non diffracted light beam led out of the preceeding diffraction element again enters the following diffraction element. This light beam is again divided into a non diffracted light beam and a diffracted light beam by means of the following diffraction element. The diffracted light beam is measured by a light detecting means in the same way as in the above mentioned case, while the non diffracted light beam advances along the above mentioned optical axis. Thus the light beam which passes through the overlapping parts is measured a plural number of times.

2 Claims, 32 Drawing Figures

DEVICE FOR MEASURING LIGHT INCIDENT ON AN IMAGE FORMING OPTICAL SYSTEM

BACKGROUND OF THE INVENTION

The present invention relates to a device for measuring light incident on an image forming optical system making use of a plural number of diffraction elements.

A patent application for a light measuring method by means of diffraction elements has been applied to patent by the present inventors in the U.S.A. on Dec. 6, 1973 under application Ser. No. 422,337 and in West-Germany on Dec. 11, 1973 under application No. P 2361626.4.

The device in accordance with the present invention is an improvement of the above mentioned applications, being improved in such a manner that a certain determined area of the light beam can be measured with weight. The present improvement is made when the device in accordance with the above mentioned application is applied to a single reflex camera as a device to carry out a light measurement, putting weight on the light measurement in the central part. The light measurement with weight in the central part means a light measuring method by means of which the weight is put on the light measurement move in the central part of the picture field than in the circumferential part. This light measurement with weight in the central part is carried out normally in such a manner that the output of the light detecting means sensing only the light beam coming from the central part of the picture field is added to the output of the light detecting means sensing the light beam coming from the whole picture field.

SUMMARY OF THE INVENTION

The purpose of the present invention is to provide a device capable of measuring a light beam in a certain predetermined area with priority.

The above mentioned purpose can be realized by arranging in the optical path of the image forming optical system only partially overlapping diffraction elements with substantially different area in such a manner that the light beam incident on the overlapping part is diffracted a plural number of times to be measured.

Hereby the word "substantially different area" is to be understood to include the case the areas are equal, because in case diffraction elements are provided sufficiently apart from each other in the converging light beam from the image forming optical system, the areas for light measurement are different even if the diffraction elements present equal areas.

Further the diffraction elements to be applied to the device in accordance with the present invention present gratings which can be distinguished from other parts (normally of gelatine) due to the difference in the density or refraction index. Hereby the gratings can either be of planar type or of volume type with thickness in three dimensional directions. However taking the loss in the light amount into consideration, the diffraction element of phase (different only in refraction index) volume type is preferable. Experiments have proved that the best result can be obtained with the thickness 1 - 20 μm.

BRIEF DESCRIPTION OF THE PREFERRED EMBODIMENT

Below the present invention will be explained in accordance with the embodiments of the present invention shown in the accompanying drawings. In the following embodiments a plural number of diffraction elements are represented by two diffraction elements for the sake of the simplicity of the explanation.

Figure 1:
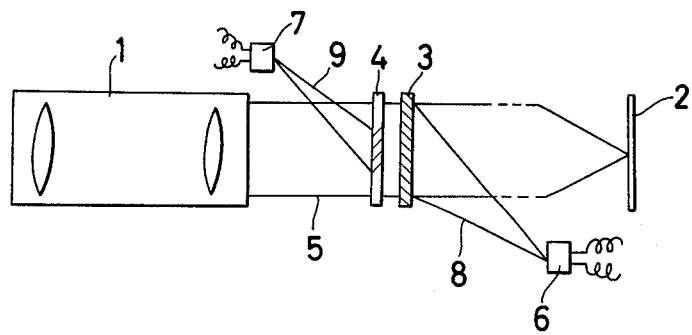
FIG. 1 shows the first embodiment of the light measuring device in accordance with the present invention.

FIG. 1 shows the first embodiment of the device in accordance with the present invention. In the drawing, 1 is the image forming optical system for forming an image on the image plane. 3 and 4 are respectively a diffraction element with difference surface area, both diffraction elements being arranged in the optical path of the light beam 5 coming from the image forming optical system 3, 4. 6 and 7 are respectively a light sensor for sensing the light beams 8 and 9 diffracted by the diffraction elements 3 and 4. In this way the light amount of the light beam coming from the image forming optical system is measured by means of the light sensors 6 and 7. Hereby the light beam 9 diffracted by means of the diffraction element is shown as if it were reflected by means of the diffraction element 4, whereby in reality it advances along the same direction as that of the light beam 8 diffracted by means of the diffraction element 3. This is only for the sake of the simplicity of the drawing.

Figure 2:
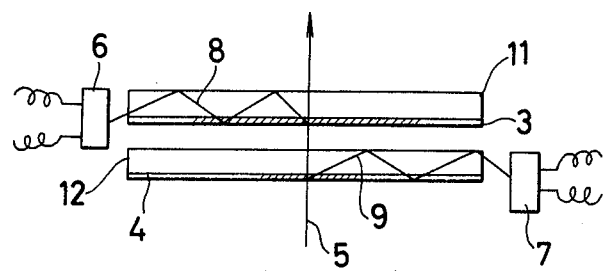
FIGS. 2 to 7 respectively show the composition of the diffraction element to be applied to the second to the seventh embodiment of the light measuring device in accordance with the present invention.

FIG. 2 shows the second embodiment of the device in accordance with the present invention. Different from the first embodiment, the diffracted light beams 8 and 9 are reflected by means of the totally reflecting plane so as to be directed perpendicular to the direction along which the light beam 5 advances. Namely the diffraction elements 3 and 4 are held by means of glass plates 11 and 12, whose refraction index almost equal to that of the diffraction elements, whereby further the diffraction elements 3 and 4 are so designed that the diffracted light beams 8 and 9 are totally reflected on the surface of the glass plates 11 and 12.

Figure 3:
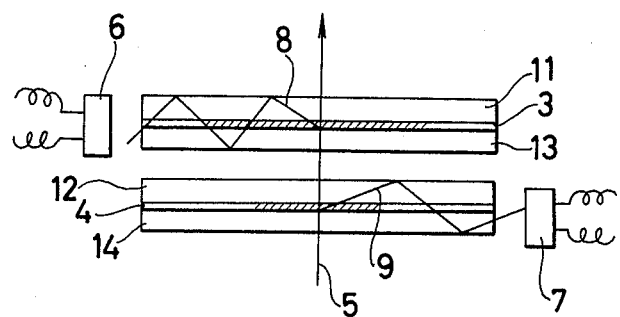

FIG. 3 shows the third embodiment of the device in accordance with the present invention. In case of the second embodiment the boundary plane between the diffraction elements 3 and 4 and the air is made use of as the totally reflecting plane while in case of the third embodiment the lower plane of the cover glasses 13 and 14 presenting almost the same refraction index as that of the diffraction elements 3 and 4 and being in close contact therewith are made use of as the totally reflecting plane.

Figure 4:
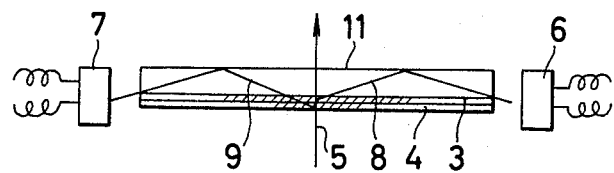

Further as in case of the fourth embodiment shown in FIG. 4. Two diffraction elements 3 and 4 can be cemented on one glass plate 11.

Figure 5:
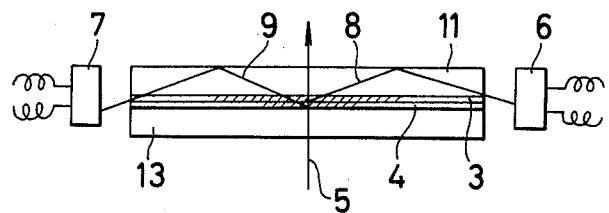

Further as in case of the fifth embodiment shown in FIG. 5 two diffraction elements 3 and 4 can be provided between two glass plates 11 and 13.

Figure 6:
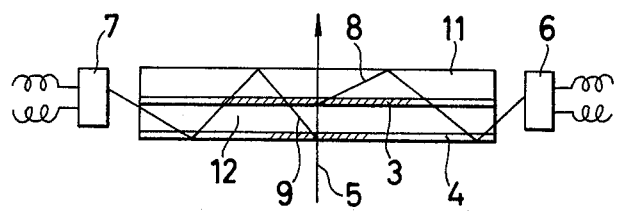
Figure 7:
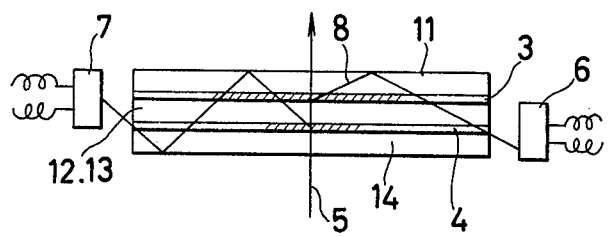

Further as is shown in FIGS. 6 and 7 two diffraction elements 3 and 4 can be brought in close contact with each other, without forming an air gap between the two diffraction elements 3 and 4 as in case of the second and the third embodiment. In case of the so far mentioned embodiments the diffraction elements are so designed that the diffracted light beams 3 and 4 advance to the right and the left respectively, while they can also be so designed that both diffracted light beams 3 and 4 advance along the same direction. Further in case of the so far mentioned embodiments two diffraction element are used, while two kinds of diffraction elements can be used, being held over each other on one holder.

Figure 8:
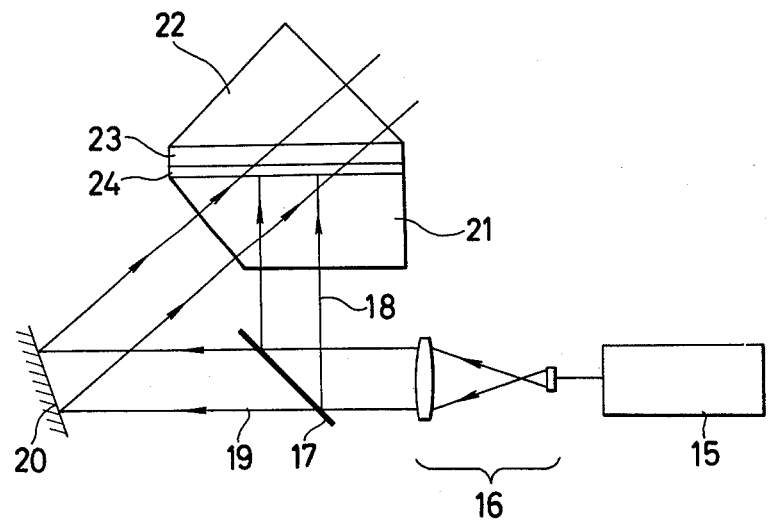
FIGS. 8 and 9 respectively show a manufacturing method of the diffraction elements to be applied to the light measuring device in accordance with the present invention.

Such diffraction elements can be manufactured by engraving lines or inclined grooves for example on glass plates, whereby the easiest method for manufacturing the elements is shown in FIG. 8. Below the manufacturing method will be explained in accordance with the case the one diffraction element 3 shown in FIG. 2 is manufactured. 15 is the source of a coherent light such as laser tube. 16 is the beam expander, 17 the beam splitter, 18 and 19 the coherent light beam splits into two beams by means of the beam splitter 17 and 20 the reflecting mirror.

21 and 22 are the prisms with almost same refraction index. Between there prisms 21 and 22 a photo-sensitive agent coated on a glass plate 23 is inserted. Hereby it is desirable that the glass plate 23 can later be made use of as the afore mentioned plane parallel glass plate 11, whereby it refraction index is almost equal to that of the prisms 21 and 22. Further it is desirable that the photo-sensitive agent 24 is coated thick enough for forming a volume hologram while the photo-sensitive agent capable of forming a phase hologram such as chromated gelatine or photopolymer is preferred. Further in order to avoid the formation of an air gap between the prisms 21 and 22, it is desired that a liquid with almost the same refraction index as that of the optical glass be put between the two prisms 21 and 22.

The one coherent light beam 18 split by means of the beam splitter 17 is directed so as to penetrate the glass plate 23 while the other coherent light beam 19 is directed by means of the mirror 20 toward the glass plate with such an angle that the coherent light beam 19 is totally reflected on the upper plane of the glass plate 23. In this way, a holographic diffraction element is manufactured.

Figure 9:
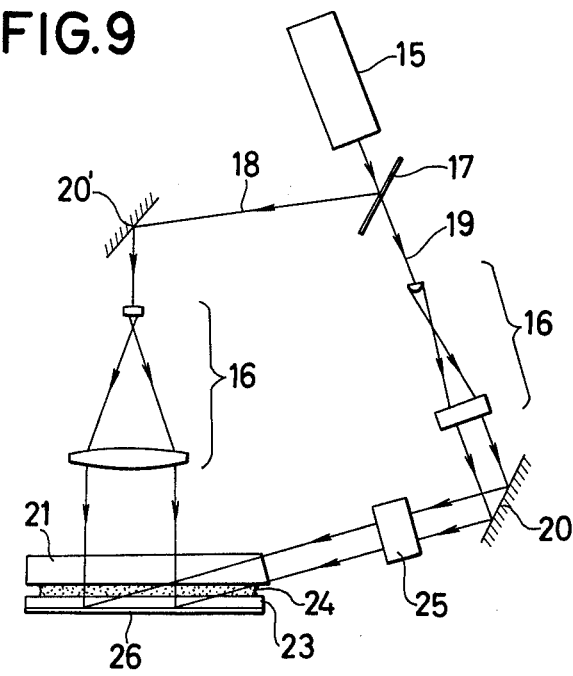
Figure 10:
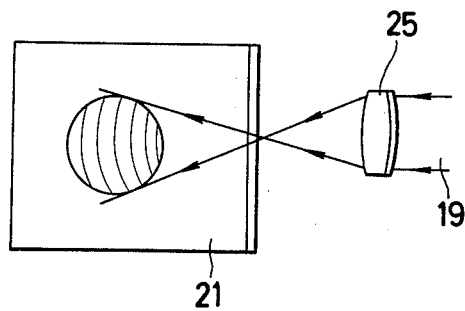
FIG. 10 shows a variation of the manufacturing method shown in FIG. 9.

FIG. 9 shows other manufacturing method of diffraction element than what is shown in FIG. 8. The difference from the method shown in FIG. 8 is that in the optical path of the coherent light beam 19 a cylindrical lens 25 is provided. As is shown in FIG. 10 the light beam 19 is converged at the position at which the light sensing element 7 is to be provided later and then diverged. Consequently the manufacturing method shown in FIG. 9 is profitable when a diffraction element manufactured by making use of such a cylindrical lens is applied to the device in accordance with the present invention, because the diffracted light beam can be converged on the light sensor without any condenser lens. Hereby 26 is a light absorbing material.

As explained so far the device in accordance with the present invention offers various profits because a plural number of the diffraction elements are provided in the light beam coming from the objective lens. For example, by arranging on the focus plane of the objective lens of the single reflex camera the device so designed that the surface area of the two diffraction elements can be varied, the central part of the two diffraction elements can be laid over each other or the external part of the two diffraction elements can be varied, the mean light measurement with weight in the central part is made possible in the TTL light measurement or many diffracted light beam can be led to the light sensor without causing a change of the color tone on the finder picture plane. This point will be explained below.

Figure 11:
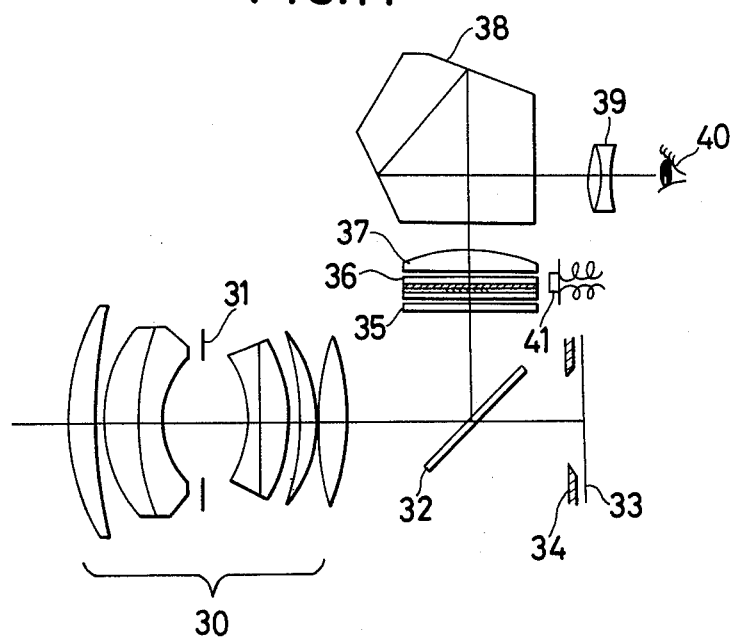
FIGS. 11 to 14 respectively show a drawing for explaining the case the light measuring device in accordance with the present invention is applied to a single reflex camera.

An embodiment of the device in accordance with the present invention, being applied to the single reflex camera will be explained in accordance with FIG. 11.

30 is the photographic lens, 31 the aperture, 32 the quick return mirror, 33 the image forming plane, 34 the shutter, 35 the focus glass (matted plate), 36 the diffraction element, 37 the condenser lens, 38 the pentagonal prism, 39 the eye piece, 40 the eye and 41 the light detecting means. The light beam coming from outside is focussed on the focus plane by means of the photographic lens 30, whereby the light beam from the focus plane enters into the diffraction element 36 in such a manner that the diffracted light beam reaches the light detecting means 41, being totally reflected while the non diffracted light beam reaches the eye through the condenser lens, the pentagonal prism and the eye piece.

Figure 12:
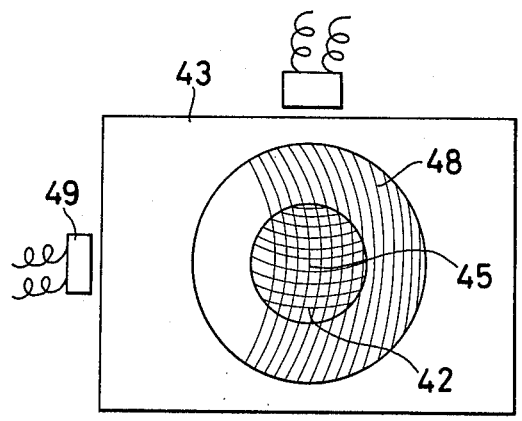
Figure 13:
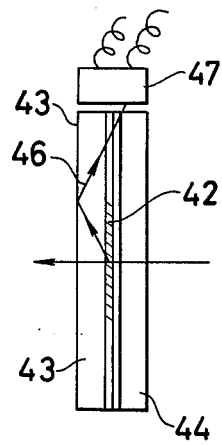
Figure 14:
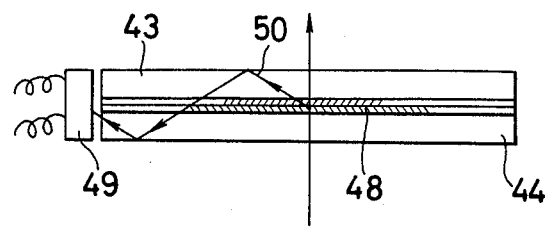

The composition of the diffraction element is shown more in detail in FIGS. 12, 13 and 14. Hereby FIG. 12 shows the plane view, FIG. 13 the side view and FIG. 14 the front view. As the diffraction element 41 any of the afore mentioned embodiment can do, while in the following explanation the element is represented by what is shown in FIG. 5. Hereby the diffraction element is manufactured by means of the method shown in FIG. 9 or FIG. 10 so as to be able to obtain a self convergent diffracted light beam. Further the first diffraction grating 42 of the element as the circle of a radius r with the center at 4 on the glass plate 43, 44, whereby the diffraction gratings 42 are so designed as to converge the diffracted light beam 46 by means of the first photoelectric converter 47. The second diffraction grating 48 is a circle of a radius R with the center at 45 similarly to the case with the first diffraction grating 42. Hereby R is larger than r. Further this diffraction grating 48 is so designed as to converge the diffracted light beam on the second photoelectric converter 49.

In consequence the light beam at the central spot can be measured by measuring the light beam the first diffraction grating 42 while the mean light beam can be measured by measuring the light beam from the second diffraction grating 48 and the light beam is measured with the weight at the center by measuring the composed light beam of the beams from the two gratings 42 and 48. Consequently for example by providing shutter means (not shown in the drawing) in from of the light sensors 47 and 49 in such a manner that the shutter means can selectively closed and opened, the light measurement with weight at center and the mean light measurement can selectively carried out. In case the results of the three kind of the light measurement are indicated by means of one meter and the diffraction efficiencies of the gratings are equal to each other, it is necessary to provide filter means because there take place a difference between the light amounts to the light sensors. Namely, it is necessary to provide a filter in front of the light sensor 48 for reducing the light amount in accordance with the ratio of the area of the gratings 42 to that of the gratings 48. Further in case of the light measurement with weight at center the outputs of the light sensors 47 and 49 are summarized so that it is necessary to reduce each light amount by half by means of filter means (not shown in the drawing) or the like. Hereby it suffices to change the sensitivity of the light sensors without making use of filter means.

So far the general explanation of the device in accordance with the present invention has been made and therefore below various improvement connected thereto will be explained in accordance with several embodiment.

Figure 15:
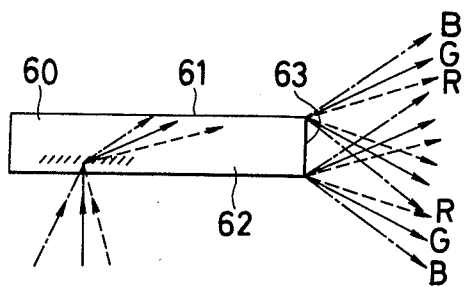
FIGS. 15 and 16 respectively the color dispersion characteristics of the deffraction elements.

The fist improvement relates to the elimination of the light measurement error arising from the difference between the diffraction angles of the diffracted light beams due to the difference in the wave length. The reason for this light measurement error will be explained in accordance with FIGS. 15 and 16. As is shown in FIG. 15, the light beam incident on the diffraction element 60 is different in the diffraction incidence angle and the diffraction angle due to the wave length in accordance with the Bragg's diffraction condition. In the drawing, B, G and R are respectively the light beam with the wave length for blue, green and red. The diffracted light beam are totally reflaced several times on both planes 61 and 62 of the diffraction element and then led out at the end surface 63 of the diffraction element. The beam diffracted at one point of the diffraction element 60 is different in the diffraction angle in accordance with the wave length so that at the end surface 63 of the diffraction element the position at which the light beam is led out is different in accordance with its wave length. The direction of the led out light beam is determined in accordance with the wave length and the angle made with the plane of the diffraction element increase in the sequence of R, G and B. Unless all the light beams led out at the end surface of the diffraction element are led to the light sensing element, there is a danger that there takes place a part which is not measured, depending upon the wave length.

Figure 16:
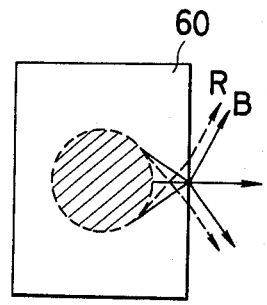

FIG. 16 shows the distribution of the light beam along the direction of the plane of the diffraction element, at the end surface of the diffraction element at which the light beam is led out, the diffraction element consisting of the diffraction gratings manufactured in accordance with the method shown in FIG. 10. The light beam diffracted by means of the diffracting gratings manufactured as mentioned above is converged at one point. When the diffraction element is so designed that the light beam is converged at one point on the end surface 63, the light beam is led out of the diffraction element as if the beam were radiated from the point. Hereby only the light beam with the wave length used for manufacturing the diffraction gratings is converged at one point due to the dispersion of the diffraction gratings, whereby the light beam with other wave length than the above mentioned is not converged completely while the point with the highest intensity deviates from the point at which the light beam with the above mentioned wave length is converged. In case the diffraction gratings are manufactured in such a manner that the light beam with the wave length for blue is converged on the end surface of the diffraction element, the point at which the intensity of the light beam diffracted by means of the diffraction gratings is highest deviates from the end surface toward the inside of the diffraction element according as the wave length of the light beam concerned approaches that for red. Hereby the light beam led out of the diffraction element advances similarly although the position of the center of the divergence is different. Consequently in case of a diffraction element with large light measuring area, the angle in which the light beam led out at the end surface of the diffraction element becomes remarkably large. There takes place a danger for the error of the light measurement if the light beam making a large angle with the central axis does not reach the light sensing element.

Figure 17:
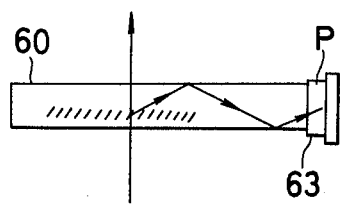
FIGS. 17, 18 and 19 respectively show the eighth, the nineth and the 10th embodiments, whereby the color dispersion characteristics of the diffraction element is compensated.

FIG. 17 shows the first measures for avoiding the above mentioned error of the light measurement. The light detecting means P is in close contact with the end surface of the diffraction element 60. Hereby it is desired that the size of this light detecting means P be equal to or larger than the thickness of the end surface 63 and the diffraction grating be so designed that the diffracted light beam is converged on the end surface 63. By means of designing the light detecting means as mentioned above, all the light can be directed toward the light detecting means P so as to obtain a superior light measurement.

Figure 18:
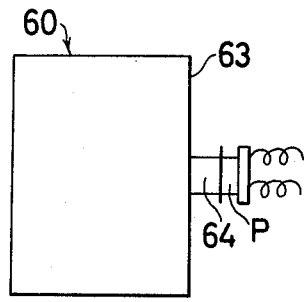

FIG. 18 shows the nineth embodiment as the second measures for avoiding the error of the light measurement. Namely in case of the embodiment shown in FIG. 18, a reflection cylinder is provided between the end surface 63 and the light detecting means P. Hereby 60 is the diffraction element, 64 the reflection cylinder, and P the light sensing element. A reflction cylinder consisting of a cylindrical glass rod with Ag, Al or the like metalized on the external surface of consisting of a hole cylinder with Ag, Al or the like metalized on the internal surface is mounted on the end surface 63 of the diffraction element 60, while the light sensing element P is provided at the other end of the reflection cylinder so as to avoid the error of the light measurement.

Figure 19:
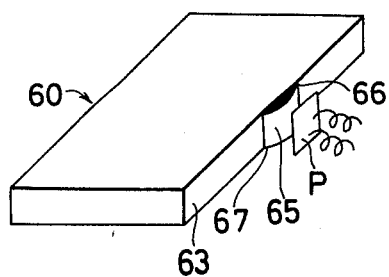

FIG. 19 shows the third measures. Hereby 60 is the diffraction element, 65 the cylindrical lens and P the light sensing element. A cylindrical lens with Ag, Al or the like metalized on the upper and the lower surface 66 and 67 as reflection plane is mounted on the end surface 63 of the diffraction element 60 so as to decrease the range of the angle in which the light beams led out of the diffraction element advance along the horizontal direction of the diffraction element and so as to lead the light beams to the light sensing element efficiently.

Figure 20:
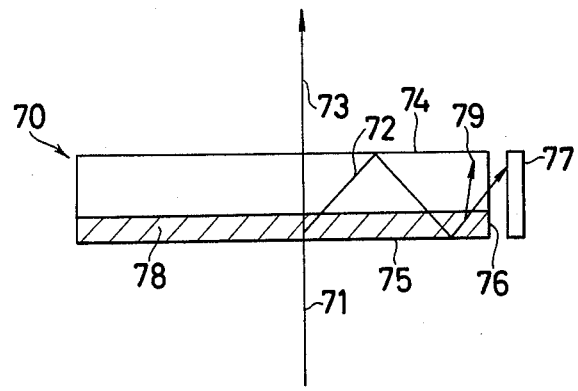
FIG. 20 shows a drawing for explaining the light beam diffracted again by means of a diffraction element.

Below an embodiment for solving the problem of the repeated diffraction will be explained. At first the repeated diffraction will be explained in accordance with FIG. 20. Hereby 70 is the diffraction element. 71 is the light beam incident on this diffraction element 70, whereby the light beam is divided by the diffraction element into the diffracted light beam 72 and the non diffracted light beam 73. As explained above, the diffracted light beam 72 is totally reflected by the totally reflecting planes 74 and 75, led out at the end surface 76 and directed toward the light detecting means 77. Hereby the light beam reflected by the totally reflecting plane 74 and 75 could be diffracted again by means of the diffraction gratings 78. In case the diffraction element is sufficiently thick, the light beam reflected by means of the totally reflecting plane 74 to reach the diffraction gratings 78 is never diffracted again while the light beam reflected by the totally reflecting plane 75 to reach the diffraction grating 78 again is diffracted again. Such repeatedly diffracted light beam 79 becomes a ghost light beam, which is very inconvenient.

The first measure to solve this problem of the repeated diffraction is to limit the size of the diffraction gratings so as to prevent the repeated diffraction. Supposing that the distance between the position 71 at which the light beam is incident on the diffraction element and the position 79 at which the light beam is diffracted again be $lo$, the angle between the diffracted light beam 72 and the normal line be $\theta$ and the distance between the totally reflecting planes 74 and 75 of the diffraction element be $d$, $lo$ can be expressed by $2 \cdot d \cdot \tan \theta$. Thus by making the diffraction gratings smaller than $2 \cdot d \cdot \tan \theta$, the problem of this repeated diffraction can be solved.

The second measures is to change the angle selection characteristics of the diffraction gratings at the position at which the repeated diffraction takes place so as to prevent the repeatedly diffracted light beam. In order to change the angle selection characteristics it suffices to change the inclination along the direction of the thickness of the diffraction gratings or the pitch of the diffraction gratings.

Figure 21:
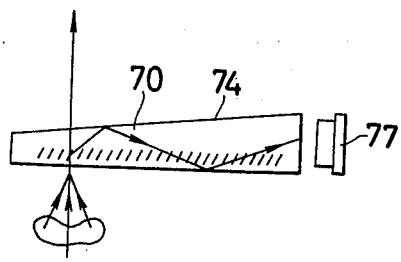
FIG. 21 shows the 11th embodiment of the diffraction element, whereby no light beam is diffracted again.

FIG. 21 shows the 11th embodiment as the third measures, whereby by means of inclining the one totally reflecting plane in such a manner that the inclination of the light beam reaching the diffraction gratings again is changed, the repeated diffraction is prevented.

Below the desirable conditions for the diffraction gratings of the diffraction element in case the device in accordance with present invention is applied to a single reflex camera will be explained. At first it is desired that the diffraction gratings should correspond with the spectroscopic sensitivity characteristics of the light detecting means to be applied to a camera. Namely in case the sensitivity of the light detecting means for red is inferior, it is natural that the diffraction grating diffracting the red light beam most be desired. Further in case the diffraction gratings diffracting a light beam with a certain determined wave length most are applied as mentioned above, the color of the image on the focus plane is different only on the part on which the diffraction gratings are provided, which is convenient because the light measuring range can be visually recognized.

Figure 22:
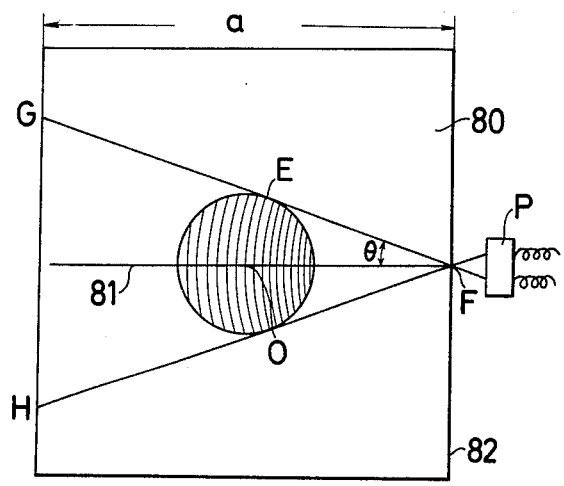
FIG. 22 shows a drawing for explaining the problem as to the limitation of the size of the diffraction gratings peculiar to the diffraction element, by means of which a diffracted light beam of self convergent type can be obtained.

Below the diffraction gratings presenting a self convergent characteristics shown in FIG. 10 will be explained. There is a limit for the dimension of the diffraction gratings presenting a self convergent characteristics. The explanation will be made in accordance with FIG. 22. Now let the angle between the normal line 81 and the plane 80 on which the diffracted light beam advancing from a point E of the diffraction gratings toward the converging point F is incident be $\theta$, $\theta$ must be smaller than or equal to $\sin^{-1}(n_1/n_0)$ in order that the diffracted light beam can be led out at the end surface 82. Hereby $n_0$ is the refraction index of the air, namely 1, while $n_1$ is that of the glass plate. Let the refraction index of the glass plate be 1.5. $\theta$ assumes the value 41.8°. In consequence the territory of the diffraction gratings in which the diffracted light beam be led out efficiently is limited to a triangle F, G, H with the angle 83.6° at F. The largest radius $r$ of the light measurement circle with the center 0 of the diffraction element 80 is given by $a/2 \sin \theta$ ($r = a/2 \sin\theta$), whereby $a$ is the length of a side perpendicular to the end surface of the glass plate. Consequently when for example, $a = 24$ mm and $\alpha = 41.8$, $r = 7.8$ mm, so that a comparatively narrow light measuring range nearly such as for the spot light measurement is obtained. However, for the mean light measurement at least $r$ must be equal to 20 mm ($r = 20$ mm).

Figure 23:
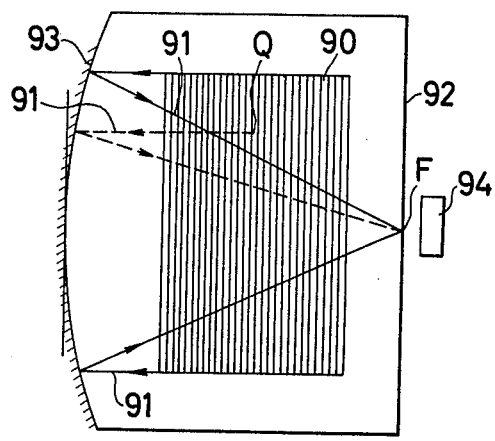
FIGS. 23 and 24 respectively show the 12th embodiment, having solved the problem shown in FIG. 22.
Figure 24:
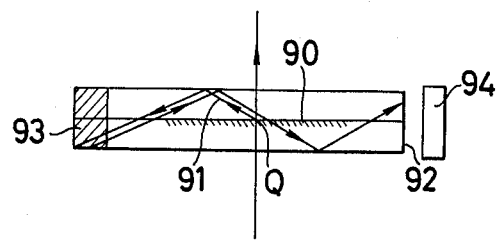
Figure 25:
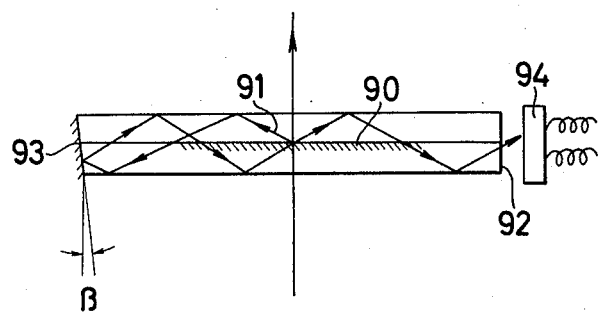
FIG. 25 shows a veriation of the twelfth embodiment.

FIG. 23 shows the 12th embodiment of the diffraction element capable of obtaining a large light measuring range. In this 12th embodiment of the diffraction gratings 90 are shown parallel. The light beam 91 diffracted by means of the diffraction gratings 90 is directed to the reflecting plane 93 opposite to the end surface 92 to be reflected by the plane 93 toward the end surface 92. Hereby the reflecting plane 93 present the efficiency for converging the diffracted light beam 91, namely being a concave mirror. Hereby it is desirable that the center of the curvature of this concave mirror assume the position F. In this way the diffracted light beam can be converged on the end surface 92 so as to be directed to the light detecting means 94. FIG. 24 shows the optical path of the diffracted light beam 91 from a point Q of the diffraction gratings 90. As is clear from this drawing, the diffracted light beam 91 reaches the diffraction gratings 90, whereby there takes place a danger of the repeated diffraction. In order to prevent this repeated diffraction it is desirable that a diffraction gratings of volume type with narrow angle selection characteristics for the incident light beam be made use of. Further in case even with this diffraction grating of volume type the repeated diffraction takes place, the structure of the gratings on the part on which the repeated diffraction takes place can be varied so as to prevent the repeated diffraction or as is shown in FIG. 25, the inclination $\beta$ can be given to the reflecting plane 93, so as to change the incident angle of the second time. Further in case a diffraction element presenting diffraction gratings with such self convergent characteristics is provided in the neighborhood of the focus plane of a single reflex camera, it is desirable that the end surface at which the light beam is led out be positioned at a proper place above the image on the focus plane, namely the place at which the image of the sky is formed.

Below the problems taking place when a plural number of diffraction gratings are overlapped each other and the measures against them will be explained in accordance with an embodiment. In order to carry out a light measurement over as large an area as possible by means of a compact and thin diffraction element, it is necessary that the angle between the normal line and the led out light beam diffracted for the first time be chosen large. In such a case, there takes place a problem that the sensitivity of the beam splitter varies depending upon the polarization of the incident light beam, which will be explained below in accordance with FIG. 26.

Figure 26:
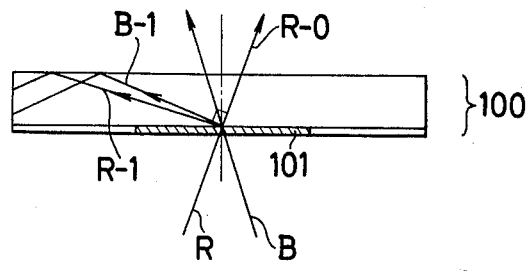
FIG. 26 shows a drawing for explaining the polarization characteristics of the diffraction element.

FIG. 26 shows the case the red light beam R and the blue light beam B reach one diffraction element 100, whereby the phase diffraction gratings 101 of volume type assumes the direction satisfying the Bragg's diffraction condition. Let the angle between the first diffracted light beam R-1 and the incident light beam be 90° for the red light beam R. The intensity of the first diffracted light beam R-1 varies depending upon the polarization state of the light beam R. In case the light beam R is of S polarization in FIG. 26, the intensity of the first diffracted light beam is maximum, while the light beam R is of P polarization the intensity of the first diffracted light beam is zero. This phenomenon is similar to the case with the polarization angle of Brewster. In consequence, for the red light beam of the P polarization the light measurement can not be made by means of this beam splitter. Further the wave length of the blue light beam B is shorter than that of the red light beam so that the diffraction angle of the blue light beam B is also smaller and the angle between the first diffracted light beam B-1 and the incident light beam B is smaller than 90° in such a manner that, although not so much as in case of the red light beam, the intensity of the first diffracted light beam is weaker when the incident light beam is of P polarization than when it is of S polarization and therefore the sensitivity is lowered.

Figure 27:
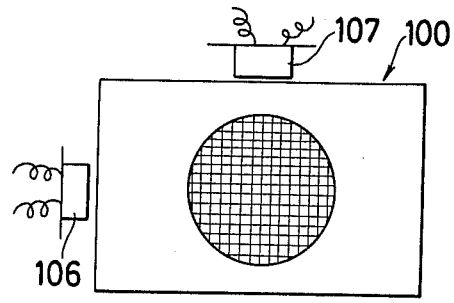
FIGS. 27, 28 and 29 respectively show a drawing for explaining the 13th embodiment, freed from the influence by the polarization characteristics of the diffraction element.
Figure 28:
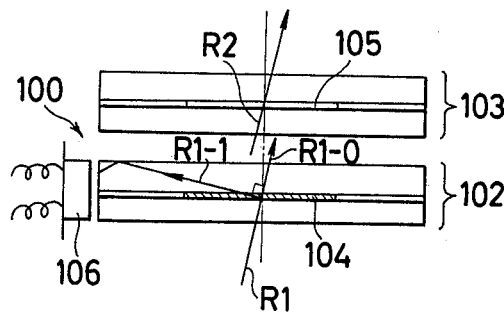
Figure 29:
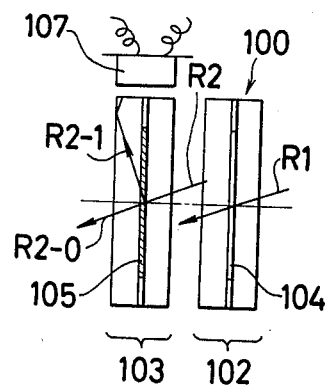

FIG. 27 shows the 13th embodiment for solving the above mentioned problem. Seen from the side, the beam splitter 100 shown in FIG. 27 assumes the construction as is shown in FIGS. 28 and 29. As is clear from these drawings, the beam splitter 100 consists of the first diffraction element 102 and the second diffraction element, whereby in each diffraction element 102. 103 a phase diffraction grating 104, 105 of volume type is incorporated. Further the angle between the direction of the carriers of these diffraction gratings is 90°. Now let us suppose that the red light beam $R_1$ be diffracted by the diffraction gratings 104 whereby the angle between the incident light beam and the first diffracted light beam R1 - 1 be 90°. Further let us suppose that the red light beam R2 is diffracted by the diffraction gratings 105 whereby the angle between the incident light beam and the first diffracted light beam R2 - 1 be 90°. Namely each diffraction gratings is same as that shown in FIG. 26. They are only arranged at right angle to each other. FIGS. 28 and 29 respectively show a beam splitter seen from the side making a right angle with each other so that the light beam of P polarization in FIG. 28 is that of S polarization in FIG. 29, while the light beam of S polarization in FIG. 28 is that of P polarization in FIG. 29. In consequence when R1 and R2 are of P polarization in FIG. 28 the intensity of the light beam $R_1$ - 1 is zero while R2 is of S polarization in FIG. 29, so that the intensity of the light beam R2 - 1 is maximum. Further when R1 and R2 are of S polarization in FIG. 28 the intensity of the light beam R1 - 1 is maximum while the light beam R2 is of P polarization in FIG. 29 so that the intensity of the light beam R2 - 1 is zero. From the above, it can be understood that the lowering of the sensitivity due to the polarization characteristics can be avoided by measuring the summary of the output signals of the light detecting means 106 and 107.

Figure 30:
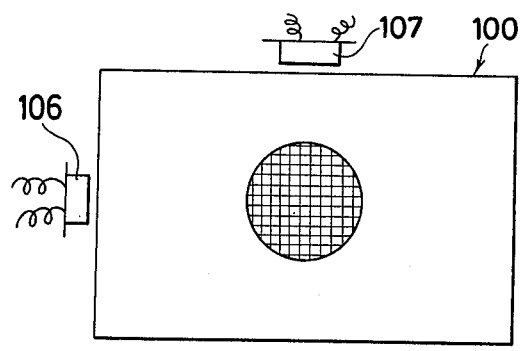
FIGS. 30, 31 and 32 respectively show a drawing for explaining the 14th embodiment as variation of the thirteenth embodiment.
Figure 31:
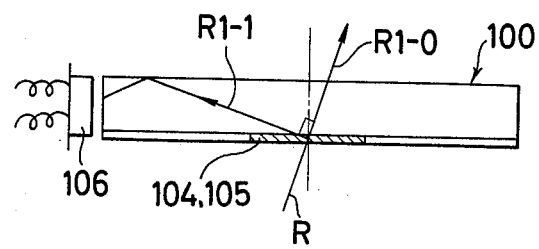
Figure 32:
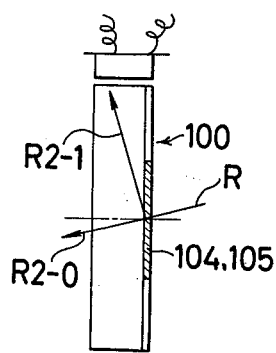

Further, in case as is shown in FIG. 30, the phase diffraction gratings of volume type presenting carries with different directions are recorded in a doubled way quite the same effect can be expected. Hereby the diffraction gratings recorded in a doubled way can be obtained by means of the manufacturing method shown in FIG. 9, whereby the photo-sensitive material 24 is turned at right angle together with the prisms 21 and 22 and exposed much. When the light beam R is of S polarization in FIG. 31, the intensity of the first diffracted light beam R1 - 1 is maximum whereby the light beam R is of P polarization in FIG. 32 so that the intensity of the first diffracted light beam R2-1 is zero. Further when the light beam R is of P polarization in FIG. 31, the intensity of the first diffracted light beam R1 - 1 is zero, whereby the light beam R is of S polarization in FIG. 32 so that the intensity of the first diffracted light beam R2 - 1 is maximum. At this time, the lowering of the sensitivity can also be prevented by measuring the summary of the outputs of the light detecting means.

So far the case the directions of the carriers of the diffraction gratings make 90° with each other has been explained. Although such arrangement as mentioned above is optimum, the polarization characteristics can be improved to some extent even when the direction of the carriers of the diffraction gratings make an optional angle with each other.

What is claimed is:

1. A device for measuring light incident on an image forming optical system, comprising:
   an image forming optical system for forming an image of an object on an image plane with which an optical path is formed;
   a plurality of diffraction lattice elements arranged in the optical path, each of which being carried by a transparent member, each having constant predetermined size and being substantially different from each other in area; and
   a photo detector means to which diffraction light from said plurality of diffraction lattice elements is directed.

2. A device for measuring light incident on an image forming optical system, comprising:
   an image forming optical system for forming an image of an object on an image plane with which an optical path is formed;
   a plurality of diffraction lattice elements arranged in the optical path, each of which being carried by a transparent member having two surfaces and an exit surface, and having substantially different area with respect to each other, whereby, a portion of light coming from the image optical system is diffracted by the diffraction lattice and the diffraction light is reflected by the surface and directed to the exit surface; and
   a photo detector means to which light coming from the exit surfaces is directed.

* * * * *

UNITED STATES PATENT OFFICE
CERTIFICATE OF CORRECTION

Patent No. 4,103,153     Dated July 25, 1978

Inventor(s) KAZUYA MATSUMOTO, et al

It is certified that error appears in the above-identified patent and that said Letters Patent are hereby corrected as shown below:

In the heading of the patent [45] should read as follows:

[45] Jul. 25, 1978

Signed and Sealed this

Sixteenth Day of January 1979

[SEAL]

Attest:

RUTH C. MASON
*Attesting Officer*

DONALD W. BANNER
*Commissioner of Patents and Trademarks*